(12) United States Patent
Prucnal

(10) Patent No.: US 8,682,170 B2
(45) Date of Patent: Mar. 25, 2014

(54) SYSTEM AND METHOD FOR BROADBAND RF INTERFERENCE CANCELLATION

(75) Inventor: Paul Prucnal, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 170 days.

(21) Appl. No.: 13/399,327

(22) Filed: Feb. 17, 2012

(65) Prior Publication Data

US 2012/0294608 A1    Nov. 22, 2012

Related U.S. Application Data

(60) Provisional application No. 61/488,521, filed on May 20, 2011.

(51) Int. Cl.
*H04B 10/00* (2013.01)
(52) U.S. Cl.
USPC .......................................... 398/115; 398/117
(58) Field of Classification Search
USPC ................... 398/39, 115–117; 380/252–254; 342/13–20
See application file for complete search history.

(56) References Cited

U.S. PATENT DOCUMENTS

| | | | |
|---|---|---|---|
| 4,131,343 A | | 12/1978 | Shoberg |
| 5,117,505 A | * | 5/1992 | Talwar ........................ 455/278.1 |
| 5,168,534 A | * | 12/1992 | McBrien et al. .................. 385/3 |
| 5,267,188 A | | 11/1993 | Pape et al. |
| 5,515,199 A | * | 5/1996 | Farina ............................ 359/326 |
| 5,548,838 A | * | 8/1996 | Talwar et al. ................. 455/304 |
| 5,574,978 A | * | 11/1996 | Talwar et al. ................. 455/63.1 |
| 5,602,387 A | * | 2/1997 | Bowen ...................... 250/227.17 |
| 5,644,665 A | * | 7/1997 | Burns et al. ........................ 385/3 |
| 5,933,001 A | * | 8/1999 | Hubbell .......................... 324/96 |
| 6,525,682 B2 | * | 2/2003 | Yap et al. ....................... 341/137 |
| 6,594,015 B1 | | 7/2003 | Asemyr |
| 6,643,417 B2 | * | 11/2003 | Strutz et al. ....................... 385/1 |
| 6,646,736 B1 | | 11/2003 | Asemyr |
| 6,667,829 B2 | | 12/2003 | Hatami-Hanza et al. |
| 6,754,411 B2 | | 6/2004 | Ahmadvand et al. |
| 6,763,155 B2 | | 7/2004 | Park et al. |
| 6,768,544 B1 | | 7/2004 | Asemyr |
| 6,778,278 B2 | | 8/2004 | Ahmadvand et al. |
| 6,782,152 B2 | | 8/2004 | Mohtat et al. |
| 6,788,716 B2 | | 9/2004 | Ahmadvand et al. |
| 6,794,191 B2 | | 9/2004 | Putnam et al. |
| 6,826,207 B2 | | 11/2004 | Xu et al. |
| 6,900,898 B2 | | 5/2005 | Ahmadvand et al. |
| 6,901,085 B2 | | 5/2005 | Hu et al. |

(Continued)

*Primary Examiner* — Agustin Bello
(74) *Attorney, Agent, or Firm* — Raymond G. Areaux; Ian C. Barras; Carver, Darden, Koretzky, Tessier, Finn, Blossman & Areaux, LLC

(57) ABSTRACT

Radio frequency transmission systems often suffer from the problem of co-site interference, where the frequency band of a strong radio transmitter overlaps with the frequency band of a co-located and/or remote radio receiver, such that the transmitter interferes with the ability of the receiver to detect a weak signal of interest. There is a need for a device that can process both the transmitted radio signal and the received radio signal to eliminate such interference. Previous attempts to solve this problem have been unable to cancel in-band interference in excess of 20 to 40 dB stronger than the signal of interest over a broad bandwidth, with large dynamic range, and with a high degree of linearity. Disclosed is a robust system and method for cancelling broadband in-band RF interference that operates in a dynamically changing multi-path environment.

24 Claims, 3 Drawing Sheets

(56) References Cited

U.S. PATENT DOCUMENTS

| | | | |
|---|---|---|---|
| 6,934,476 B2* | 8/2005 | LaGasse | 398/135 |
| 7,016,554 B2 | 3/2006 | Mitchell et al. | |
| 7,058,097 B2 | 6/2006 | Ahmadvand | |
| 7,058,368 B2* | 6/2006 | Nicholls et al. | 455/114.2 |
| 7,076,168 B1* | 7/2006 | Shattil | 398/76 |
| 7,209,501 B2 | 4/2007 | Xu et al. | |
| 7,231,151 B2* | 6/2007 | LaGasse | 398/135 |
| 7,262,902 B2 | 8/2007 | Burns et al. | |
| 7,292,196 B2 | 11/2007 | Waterhouse | |
| 7,295,584 B2 | 11/2007 | Ahmadvand et al. | |
| 7,324,268 B2 | 1/2008 | Qiao et al. | |
| 7,359,580 B2* | 4/2008 | Darcie et al. | 385/3 |
| 7,366,244 B2* | 4/2008 | Gebara et al. | 375/259 |
| 7,369,290 B1 | 5/2008 | Cox et al. | |
| 7,400,787 B2 | 7/2008 | Burns | |
| 7,405,870 B2 | 7/2008 | Qiao et al. | |
| 7,421,211 B2* | 9/2008 | Hayashi et al. | 398/196 |
| 7,450,077 B2 | 11/2008 | Waterhouse et al. | |
| 7,457,032 B2 | 11/2008 | Qiao et al. | |
| 7,490,998 B2 | 2/2009 | Atieh et al. | |
| 7,555,219 B2 | 6/2009 | Cox et al. | |
| 7,561,803 B2 | 7/2009 | Burns et al. | |
| 7,760,343 B2 | 7/2010 | Roussell et al. | |
| 7,809,216 B2 | 10/2010 | Cox, III | |
| 7,826,751 B2 | 11/2010 | Cox et al. | |
| 7,856,184 B2* | 12/2010 | Li | 398/115 |
| 7,957,648 B2* | 6/2011 | Hillis et al. | 398/115 |
| 7,970,241 B2 | 6/2011 | Chen et al. | |
| 8,098,991 B2* | 1/2012 | DeSalvo et al. | 398/115 |
| 8,103,175 B1* | 1/2012 | Kowalczyk et al. | 398/200 |
| 8,180,183 B1* | 5/2012 | Yap | 385/2 |
| 8,213,807 B1* | 7/2012 | Kowalczyk et al. | 398/192 |
| 8,340,523 B2* | 12/2012 | Shen et al. | 398/85 |
| 8,428,471 B2* | 4/2013 | Chen et al. | 398/185 |
| 8,433,163 B2 | 4/2013 | Cox et al. | |
| 8,530,907 B2 | 9/2013 | Chen et al. | |
| 2003/0090769 A1* | 5/2003 | LaGasse | 359/187 |
| 2005/0063035 A1 | 3/2005 | Mitchell et al. | |
| 2006/0083456 A1 | 4/2006 | Burns et al. | |
| 2006/0161225 A1 | 7/2006 | Sormann | |
| 2006/0228065 A1 | 10/2006 | Burns | |
| 2007/0040761 A1 | 2/2007 | Waterhouse | |
| 2007/0046556 A1 | 3/2007 | Waterhouse | |
| 2007/0065147 A1 | 3/2007 | Qiao et al. | |
| 2007/0189778 A1 | 8/2007 | Burns et al. | |
| 2007/0212075 A1* | 9/2007 | Yin | 398/183 |
| 2007/0237441 A1 | 10/2007 | Roussell et al. | |
| 2007/0285324 A1 | 12/2007 | Waterhouse et al. | |
| 2007/0297044 A1 | 12/2007 | Qiao et al. | |
| 2008/0002991 A1* | 1/2008 | Masuda et al. | 398/198 |
| 2008/0037999 A1* | 2/2008 | Masuda et al. | 398/186 |
| 2008/0181612 A1 | 7/2008 | Mills et al. | |
| 2008/0181615 A1 | 7/2008 | Atieh et al. | |
| 2008/0193124 A1 | 8/2008 | Atieh et al. | |
| 2008/0212968 A1* | 9/2008 | Lindop et al. | 398/91 |
| 2008/0227410 A1 | 9/2008 | Cox | |
| 2009/0060412 A1 | 3/2009 | Chen et al. | |
| 2009/0067771 A1 | 3/2009 | Chen | |
| 2009/0247074 A1 | 10/2009 | Cox et al. | |
| 2009/0263081 A1 | 10/2009 | Cox et al. | |
| 2009/0263137 A1* | 10/2009 | Hossein-Zadeh et al. | 398/115 |
| 2009/0274466 A1 | 11/2009 | Cox et al. | |
| 2010/0189439 A1 | 7/2010 | Novak et al. | |
| 2010/0196013 A1* | 8/2010 | Franklin | 398/115 |
| 2010/0247104 A1* | 9/2010 | Yu et al. | 398/115 |
| 2011/0020005 A1* | 1/2011 | Iannelli | 398/115 |
| 2011/0287720 A1* | 11/2011 | Cox et al. | 455/63.1 |
| 2011/0299849 A1* | 12/2011 | Klotz et al. | 398/26 |
| 2012/0001543 A1 | 1/2012 | Chen et al. | |
| 2012/0182176 A1 | 7/2012 | Maunder et al. | |
| 2012/0243874 A1* | 9/2012 | Logan et al. | 398/116 |
| 2012/0251031 A1* | 10/2012 | Suarez et al. | 385/3 |
| 2012/0294608 A1* | 11/2012 | Prucnal | 398/39 |
| 2012/0301149 A1* | 11/2012 | Pinguet et al. | 398/115 |
| 2012/0315049 A1* | 12/2012 | Banwell et al. | 398/115 |

* cited by examiner

SYSTEM AND METHOD FOR BROADBAND RF INTERFERENCE CANCELLATION

CROSS-REFERENCE TO PRIOR FILED APPLICATION

This application claims priority to earlier filed U.S. provisional patent application No. 61/488,521 filed on May 20, 2011, which is herein incorporated by reference in its entirety.

UNITED STATES GOVERNMENT RIGHTS

This invention was made with government support under Subaward #96183NBS68 from Booz Allen Hamilton, Inc. to Princeton University (PRIME: U.S. Army, Grant #W15P7T-06-D-E401) and Subaward #S12-119176 from CACI Technology, Inc. to Princeton University (PRIME: U.S. Army—Fort Monmouth, Grant #TESS W15P7T-09-D-P013). The government has certain rights in this invention.

FIELD OF INVENTION

The present disclosure generally relates to a new system and method for broadband RF interference cancellation that will allow co-located and/or remote interferers and communication equipment to operate in harmony.

BACKGROUND

Due to exponential growth in the demand for radio frequency (RF), the radio spectrum is extremely crowded and becoming more crowded every day. Multiple wireless systems are allocated in close proximity or even in the same radio spectrum. As a result, optimum performance of one system cannot be achieved due to interference caused by another system, including narrowband interference of a wideband signal, remote wideband interference, and co-site interference. Each of these interference-related issues is challenging and critically important to efficient spectrum use. For maximum utilization of wireless equipment a system that seamlessly allows existing communication equipment to operate in harmony with interfering transmitters is required.

SUMMARY OF THE INVENTION

A system and method for broadband RF interference cancellation are disclosed. The system and method allows co-located and/or remote interferers and communication equipment to operate in harmony including operation on the same channel. The disclosed interference cancellation system (ICS) substantially reduces interference that cannot be removed by receiver RF front end filters.

A coherent approach uses a dual parallel electrical RF signal to optical signal converter (converter), e.g., a dual drive Mach Zehnder modulator. Cancellation is accomplished by destructive interference of the optical field, rather than by incoherent addition of intensities. The result is annihilation of the optical signal rather than adding to a quiescent DC optical level. The advantages include improvement of SNR by removing the DC pedestal, and increased linearity and dynamic range due to the use of linear phase modulation rather than nonlinear intensity modulation. The advantages also include elimination of the S21 mismatch problem entirely. Matched filtering between the transmitted and received signal may also be done electrically.

An optical matched filter may be integrated into one of the arms of the Mach Zehnder modulator. This allows for the whole system to reside on a single chip. As this places a limit on the length of the delay, the optical matched filter may be used for fine tuning in conjunction with electrical matched filtering.

DETAILED DESCRIPTION OF THE INVENTION

Figure 1:
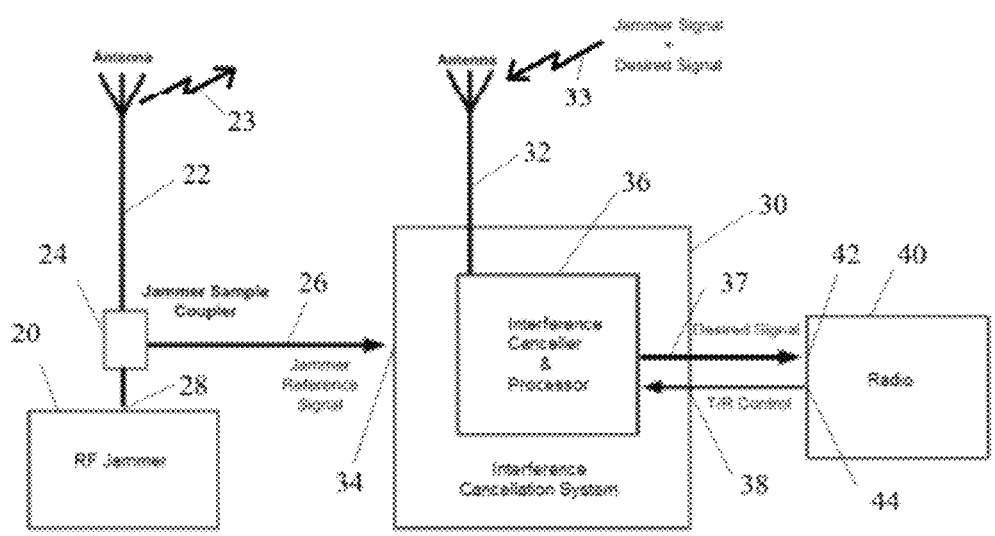
FIG. 1 is a system architecture block diagram showing a radio frequency (RF) interferer, radio transmitter/receiver (T/R) and an interference cancellation system (ICS)

Disclosed is a system and method that allows co-located and/or remote interferers and communication equipment to operate in harmony. FIG. 1 is a schematic of an example system architecture and illustrates the relationship between a radio frequency (RF) interferer 20, interference cancellation system (ICS) 30 and radio 40. Power sources for these devices are not shown for purposes of clarity. The provision of appropriate power for such devices, e.g., AC or DC power, from the power grid batteries or other sources, is well known to those skilled in the art. The examples disclosed herein focus on the radio 40 receive functionality. However, it should be understood that the radio 40 may be capable of both transmit and receive functionality. The ICS 30 is configured to substantially reduce jamming interference that cannot be removed by known radio receiver RF front end filters.

The RF interferer 20 includes an interferer antenna 22 configured to transmit an interferer signal shown graphically by arrow 23. It should be understood that a wide variety of RF ramming devices having a variety of signal formats may be used, e.g., random noise, random pulse, stepped tones, warbler, random keyed modulated CW, tone, rotary, pulse, spark, recorded sounds, gulls, sweep-through techniques and the like. An interferer sample coupler 24 is configured to generate an interferer reference signal 26. In this example, the interferer sample coupler 24 is coupled between the RF output 28 of the RF interferer 20 and the interferer antenna 22. It should also be understood that a variety of sampling devices may be used without departing from the scope of the invention, including devices tapped into various locations in the RF interferer circuitry or output stages. It should be understood that RF interferer 20 may have a variety of other inputs, outputs and controls that are not shown. The provision of such features is well known to those skilled in the art.

The ICS 30 has an ICS antenna 32. In this example, the ICS antenna 32 is configured to receive RF signals such as an interferer signal plus a desired signal as shown by arrow 33. The interferer reference signal 26 is coupled to the ICS 30 interferer reference input 34. The ICS 30 generally has an interference canceller and processor 36 as described below. The ICS 30 also has a desired signal output 37 and a transmit/receive (T/R) control input 38. The ICS 30 is configured to remove at least a portion of the interferer signal 23 from the signal received by ICS antenna 23. The resulting signal is output via the desired signal output 37 and is effectively the desired signal, e.g., an RF transmission of interest, with the interferer signal 23 significantly reduced in amplitude. In typical applications, the ICS may be capable of a 35-50+ dB reduction in the jamming signal 23 at the desired signal output 37.

The radio 40 has an antenna input 42 coupled to the ICS 30 desired signal output 37. The radio 40 also has a transmit/receive (T/R) control output 44, e.g., coupled via a T/R bypass switch, coupled to the ICS 30 transmit/receive (T/R) control input 38. It should be understood that radio 40 may have a variety of other inputs and outputs, e.g., voice and data ports, as well as a variety of controls that are not shown. The provision of such features is well known to those skilled in the art.

Figure 2:
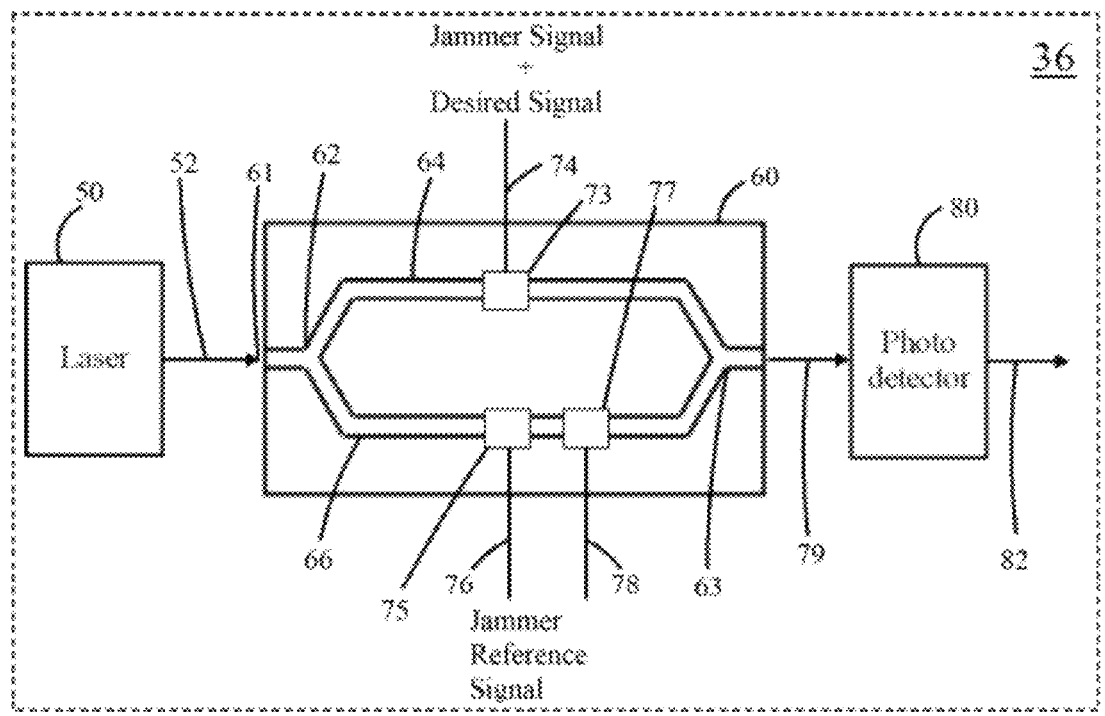
FIG. 2 is a block diagram of an interference canceller and processor.

The ICS 30 generally includes an interference canceller and processor 36. The interference canceller and processor 36 performs RF to optical conversion with a dual parallel electrical RF signal to optical signal converter (converter), e.g., a Dual Parallel Mach-Zehnder modulator (DPMZ), configured for a "Coherent Optical" cancellation approach as shown in FIG. 2. The advantages of the DPMZ in this configuration are improved RF amplitude and phase tracking, minimal DC offset, and reduced distortion as compared with systems using two nearly identical MZ modulators on the same chip. It should be understood that other converters may be used to implement an interference canceller based on the disclosure herein, e.g., a Dual Drive Mach-Zehnder (DDMZ). In this example, the interference canceller and processor 36 includes a laser light source (laser) 50 having an output 52 coupled to input 61 of DPMZ 60. The output 79 of the DPMZ 60 is coupled to a photo detector 80. The output 82 of the photo detector 80 may then be coupled to a radio antenna input, e.g., antenna input 42 of radio 40 (FIG. 1). It should be understood that various filtering and/or amplitude adjustments may be implemented in the various optical links between the laser 50, DPMZ 60, photo detector 80 and the antenna input 42.

The DPMZ 60 can be implemented using a crystal, such as lithium niobate, whose refractive index varies as a function of the strength of the local electric field. Suitable converter units may be obtained from various manufacturers including JDS UNIPHASE Corporation (www.jdsu.com) of Milpitas, Calif., COVEGA TECHNOLOGY (now THORLABS—www.thorlabs.com) and FUJITSU (www.fujitsu.com) of Tokyo Japan. The DPMZ 60 includes an input 61 and output 79. Two optical paths are defined between the input 61 and output 79. The DPMZ includes a splitter 62 feeding a first arm 64 and a second arm 66. The first and second arms 64, 66 terminate at a combiner 63. The first and second arms 64, 66 include first and second electrodes 73, 75 coupled to input terminals 74, 76 respectively. Input terminals 74, 76 are used to vary the electric field and therefore the refractive index of the first and second arms 64, 66 respectively. For matters of simplicity, ground terminals are not shown. Each arm 64, 66 functions as a linear phase modulator. The second arm 66 also includes a phase compensator 77 that is configured to shift the phase of the light traveling through the second arm by 180 degrees. The phase compensator 77 may be externally adjustable via the phase compensator terminal 78, e.g., adjusted based on the laser frequency and other factors. In general, the interferer+desired signal (output of ICS antenna 32) is coupled to the first terminal 74. The interferer reference signal 26 is coupled to second terminal 76.

In operation, light from laser 50 enters the DPMZ input 61 and is split between arms 64 and 66. With two identical RF signal inputs coupled to the input terminals 74, 76, the DPMZ optically cancels the carrier, resulting in RF cancellation (zero light output). If a desired signal is present along with the interferer signal, the interferer signal is optically cancelled by the DPMZ and the desired signal with the interferer signal significantly reduced is output via DPMZ output 79. The disclosed coherent optical approach generates minimal DC offset compared to non-coherent approaches, which cancel only the RF envelope but not all the light (carrier), leaving a residual DC offset at the photo detector output. The disclosed coherent optical approach converts the interferer reference signal 26 to optical using a single laser modulator, providing better linearity than the incoherent MZ modulator approaches.

Figure 3:
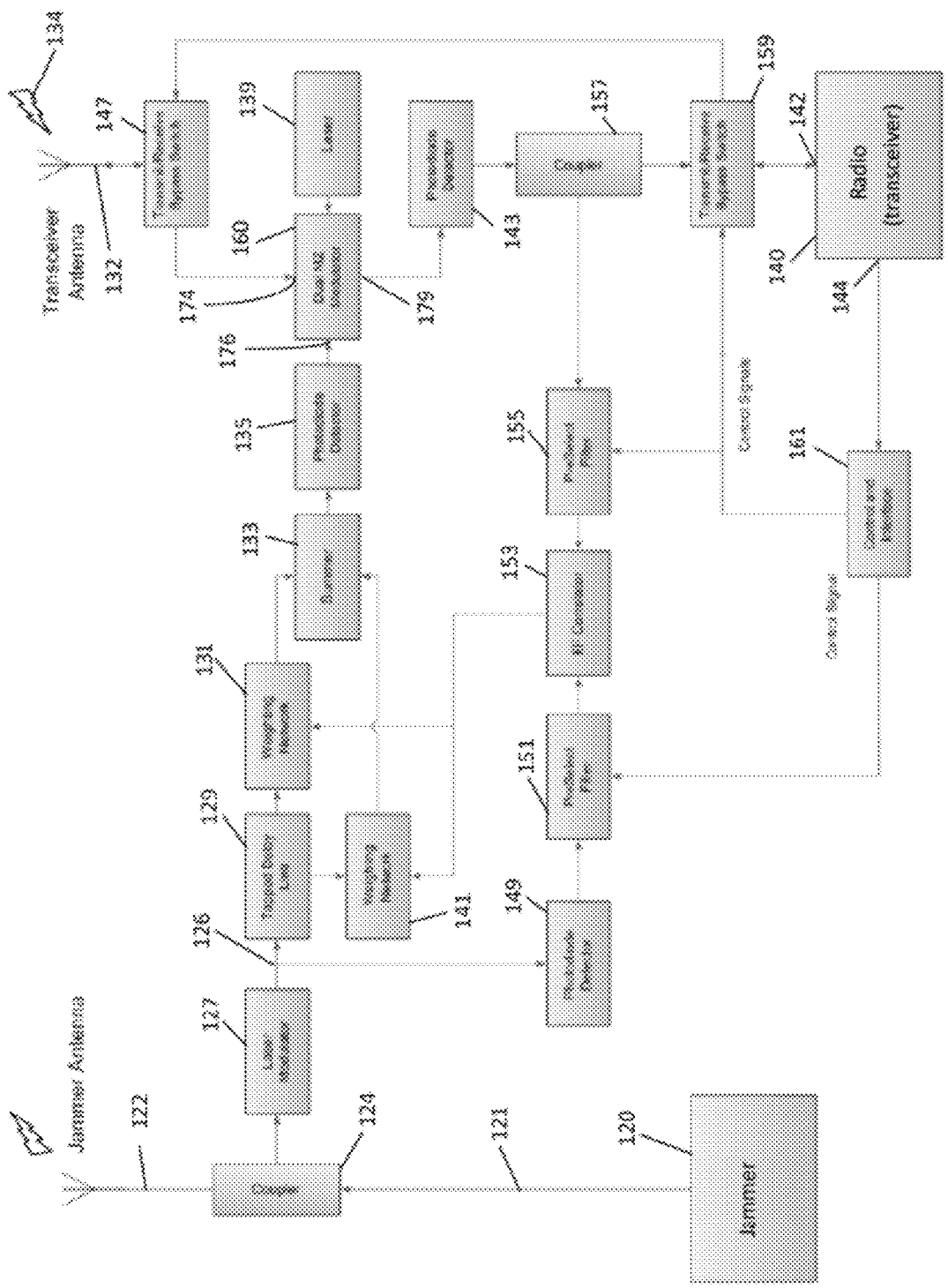
FIG. 3 is a detailed system diagram.

FIG. 3 is a detailed system diagram. The system includes an RF interferer 120 having an output 121 coupled to an interferer antenna 122 via an interferer sample coupler 124. The output of the interferer sample coupler 124 is coupled to a laser modulator 127. A length of optical cable may be used to provide the interferer reference signal 126 to a tapped delay line 129 with a delay very close to the antenna coupling delay, to minimize dispersion for broadband cancellation in addition to RF isolation. This approach also relies on optical delay and weighting of the interferer reference signal 126.

Variable optical attenuators and delays may be used for the weighting network 131 to achieve the RF phase shift and delays that are needed for RF signal cancellation. The tapped delay line/weighting network summed as shown by block 133. The output of the summer 133 is converted back to RF using a photodiode detector 135 for minimal distortion. The resulting signal is coupled to electrode 176 of DPMZ 137.

On the receive side, transceiver antenna 132 receives the interferer signal and the desired signal as shown by arrow 134. The received signal passes through T/R bypass switch 147 and is coupled to electrode 174 of DPMZ 160. The inputs to electrodes 174 and 176 are used by the DPMZ 160 for coherent cancellation of the interferer signal. The cancelled interferer signal residue plus desired receive signal are output via DPMZ output 179. The DPMZ output 179 is converted back to RF using a photo diode 143 as shown. The resulting signal is coupled to the radio antenna input 142. A sample of the cancelled output, filtered and correlated with the sample of the interferer signal, is provided by coupler 157. This signal functions as a control signal for the tapped delay and weighting networks to minimize the jamming signal. The output of the coupler 157 is routed to a preselect filter 155. The resulting filtered output is correlated by block 153 and is routed via an RF connector to weighting network 151. A weighted control signal is then routed from the weighting network 141 to summer 133. A portion of the interferer reference signal 126 is routed to a photodiode detector 149 and then a preselect filter 151. The resulting filtered output is correlated by block 153 as discussed above. The radio also includes a T/R control output that is coupled to a control interface 161. The control interface 161 generates outputs that are coupled to the preselect filter 155 and the T/R bypass switch 159.

In general, the adaptive control loop amplitude and phase control inputs are supplied through correlation of the interferer signal sample with a sample of the summed weighted interferer and coupled interferer signals at the transceiver input. Both the interferer sample signal and the cancelled interferer plus desired receive signal are converted to RF using photodiodes and correlated using an RF correlator. Any resultant interferer signal present at the transceiver input causes a correlator output, which is then used to control both amplitude and phase of the weighting network. The loop controls both amplitude and phase for zero correlator output, indicating a completely cancelled interferer signal. Any DC offsets in the control loop reduce the cancellation depth. These DC offsets are due to RF coupling of the interferer signal into the ICS correlator input path, in addition to component DC offsets. The interferer cancellation depth is a function of the correlator dynamic range.

The disclosed coherent ICS provides interferer multipath cancellation for the second and third multipath coupling, since the larger multipath delays are considerably lower in amplitude due to the higher path loss. A tapped delay line with weighted taps provides the delays and phasing necessary for direct and multipath cancellation. The tapped delay line implementation can be achieved optically or using RF components. RF-only ICS techniques are limited in cancellation bandwidth due to the RF component amplitude and phase dispersion vs. frequency.

With the specific embodiment described, multipath cancellation would typically be performed by adaptive matched filtering in the electrical domain, prior to the Dual MZ Modulator, as shown in FIG. 3. Any bandwidth limitation of such an electrical filter compared to the bandwidth of the optical cancellation in the MZ Modulator may be overcome by integration on the modulator chip of an optical waveguide-based adaptive matched filter, including the appropriate weights and delays to compensate for the multipath channel characteristic.

Figure 4:
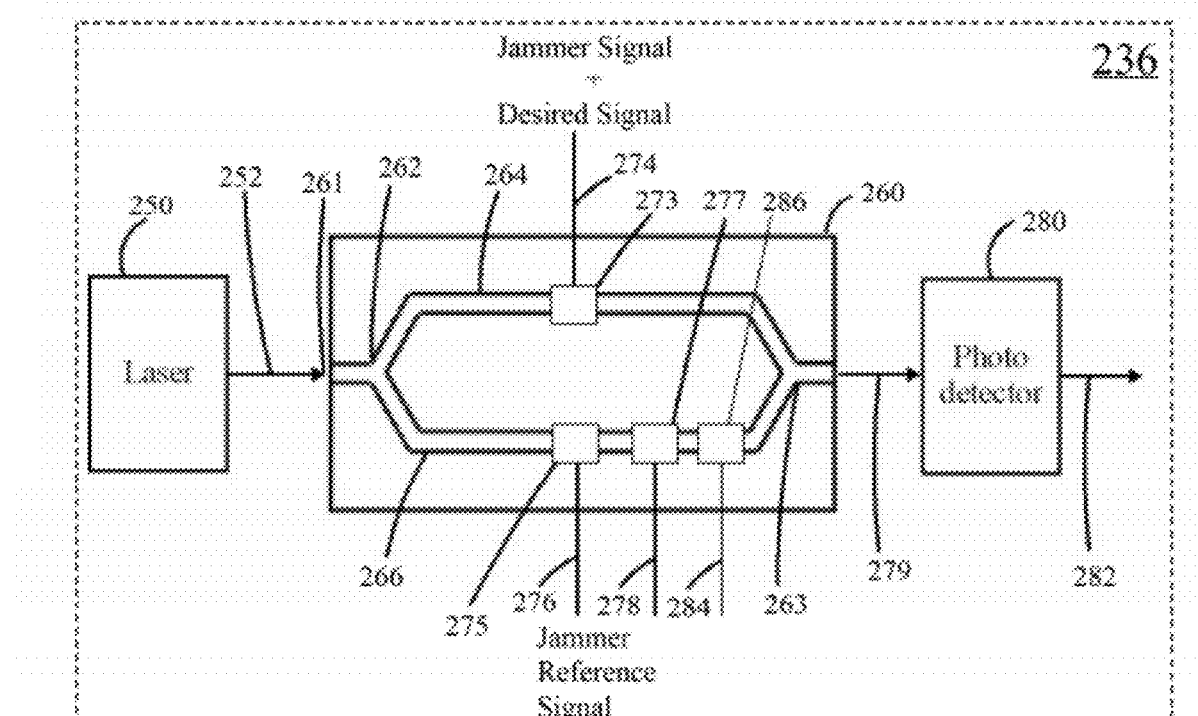
FIG. 4 is a block diagram of an interference canceller and processor including an on-chip optical matched filter.

FIG. 4 shows a DPMZ 260 implemented with an optical adaptive matched filter 286. The DPMZ 260 includes an input 261 and output 279. Two optical paths are defined between the input 261 and output 279. The DPMZ includes a splitter 262 feeding a first arm 264 and a second arm 266. The first and second arms 264, 266 terminate at a combiner 263. The first and second arms 264, 266 include first and second electrodes 273, 275 coupled to input terminals 274, 276 respectively. Input terminals 274, 276 are used to vary the electric field and therefore the refractive index of the first and second arms 264, 266 respectively. For matters of simplicity, ground terminals are not shown. Each arm 264, 266 functions as a linear phase modulator. The second arm 266 includes a phase compensator 277 that is configured to shift the phase of the light traveling through the second arm by 180 degrees. The phase compensator 277 may be externally adjustable via the phase compensator terminal 278, e.g., adjusted based on the laser frequency and other factors. The second arm also includes an optical adaptive matched filter 286 configured to supplement the adaptive electrical matched filtering at the front-end. The optical adaptive matched filter 286 may be externally adjustable via the optical adaptive matched filter compensator terminal 284, e.g., adjusted based on the laser frequency and feedback from the adaptive elements, as well as other factors. In general, the interferer+desired signal, e.g., output of ICS antenna 32, is coupled to the first terminal 274. The interferer reference signal, e.g., as shown by reference number 26 in FIG. 1, is coupled to second terminal 276 as discussed above in connection with FIG. 2.

In operation, light from laser 250 enters the DPMZ input 261 and is split between arms 264 and 266. With two identical RF signal inputs coupled to the input terminals 274, 276, the DPMZ optically cancels the carrier, resulting in RF cancellation (zero light output). If a desired signal is present along with the interferer signal, the interferer signal is optically cancelled by the DPMZ and the desired signal with the interferer signal significantly reduced is output via DPMZ output 279.

The converter may be configured with an optical adaptive matched filter with a series of optical weights and delays. The optical adaptive matched filter may be based on a photonic implementation of a finite impulse response (FIR) filter, which is a common and well-known filter used for signal processing. In conjunction with RF matched filtering, the adaptive optical filter may aid in the cancellation of multipath reflections. The adaptive optical matched filter, along with a front-end RF matched filter, may compensate for the aggregate effect of multipath reflections by emulating the channel response of the environment. Such multipath compensation is achieved via a series of taps and delays, both in the RF filter as well as the optical filter. The optical matched filter achieves the weighting and delaying effects via arrays of variable optical attenuators and optical delay lines.

The use of both an RF matched filter and an adaptive optical matched filter allows for coarse and fine-tuning (respectively) of multipath compensation. The RF/electrical matched filter at the front-end provides the ability to coarsely adjust multipath compensation through the use of traditional digital signal processing (DSP)-based filtering algorithms. A suitable electrical matched filter may be implemented with a series of weights and delays. In operation the electrical match filter sums the various taps together at the filter output. In effect, the electrical matched filter roughly approximates the channel response between the interferer and receiver, and applies this to the interferer reference signal. This modified reference signal is then fed to the optical matched filter via terminal 276. The optical adaptive matched filter is similar to the electrical filter in that it applies a series of weights and delays to the input signal. The matched optical filter is located in the bottom arm of the DPMZ (266). Specifically, the optical filter begins at terminal 284. A 1:n optical splitter splits the optical signal n ways. These n signals then enter an n-channel array of variable optical attenuators, where each of the n signals can be individually attenuated by some amount. Each of the attenuated signals is then delayed by some fixed amount, and the weighted+delayed signals are then "summed" by a single mode to multi-mode (SM:MM) optical coupler. The signal from both arms (264 and 266) are then combined at terminal 263, and the total signal is then to a multi-mode photodetector where the desired signal is then converted back to the electrical domain. The purpose of using an RF matched filter in conjunction with an adaptive optical matched filter is that DSP-based filtering is able to accommodate large delay adjustments that optical components cannot provide. Essentially, the electrical matched filter provides a coarse approximation of the channel response, and then the optical adaptive matched filter provides the fine-tune adjustments to the interferer reference signal, such that the interferer reference signal matches the interferer signal nested within the (interferer+desired) signal.

The following papers are related to the invention and are incorporated by reference in their entirety as if fully set forth herein: John Suarez, Paul R. Prucnal, "Incoherent Method of Optical Interference Cancellation for Radio Frequency Communications", IEEE Journal of Quantum Electronics, Vol. 45, NO. 4, pp. 402-408; John Suarez, Paul R. Prucnal, "System Level Performance and Characterization of Counter-phase Interference Cancellation", Journal of Lightwave Technology, Vol. 28, Issue 12, pp. 1821-1831 (2010); Ward, M. J., Keefer, C. W., Andrews II, H. G., "Design and Fabrication of a Multichannel Adaptive OPTICAL Processor (MADOP)", In-House Report, RL-TR-92-333, December 1992; H. Brahimi, P. H. Merrer, and O. Llopis, "CAD of Microwave Optical Systems for Time and Frequency Applications", LAAS-CNRS, Toulouse University, France, 2006; and T. Akajoki, O. Pekonen, and A. Tanskanen, "Model Optical Transmitters with a Circuit Simulator", Microwaves & RF, April 2005

Although features and elements are described above in particular combinations, each feature or element may be used alone without the other features and elements or in various combinations with or without other features and elements.

What is claimed is:

1. An interference cancellation system (ICS) comprising:
a dual parallel electrical RF signal to optical signal converter having an optical input for a light source and an optical output, the converter being configured with a first arm having a first electrode configured to vary the refractive index of the first arm and a second arm having a second electrode configured to vary the refractive index of the second arm;
the first electrode being configured to receive an interferer signal combined with a desired signal, the second electrode being configured to receive an interferer reference signal;
the converter being configured to optically cancel at least a portion of the interferer signal and having a converter output configured to output the desired signal combined with a reduced interferer signal.

2. The system of claim 1, wherein the dual parallel electrical RF signal to optical signal converter is a dual parallel Mach-Zehnder modulator (DPMZ).

3. The system of claim 1, wherein the second arm includes a phase compensator configured for a 180 degree phase shift of light traveling through the second arm.

4. The system of claim 1 further comprising a radio frequency (RF) interferer configured to generate the interferer signal.

5. The system of claim 4 wherein the RF interferer includes an RF output coupled to an interferer antenna via a coupler, the coupler being configured to generate the interferer reference signal.

6. The system of claim 1 further comprising a radio configured to receive the converter output and process the desired signal.

7. The system of claim 6 wherein the radio includes a transmit/receive switch configured to control signal reception from the converter output.

8. The system of claim 6 wherein the radio has an antenna input coupled to the converter output.

9. The system of claim 1 further comprising an ICS antenna coupled to the first electrode of the converter.

10. The system of claim 1 further comprising a photo detector coupled to the converter output, the photo detector having an output configured for connection to a radio antenna input.

11. The system of claim 1, wherein the second arm includes an optical adaptive matched filter.

12. The system of claim 11, where the optical adaptive matched filter is a closed-loop system having optical filter weights, such that the converter output controls fine-tune adjustments of the optical filter weights.

13. An interference cancellation method comprising:
providing a dual parallel electrical RF signal to optical signal converter having an optical input for a light source and an optical output, the converter being configured with a first arm having a first electrode configured to vary the refractive index of the first arm and a second arm having a second electrode configured to vary the refractive index of the second arm;
providing an interferer signal combined with a desired signal to the first electrode;
providing an interferer reference signal to the second electrode;
the converter being configured to optically cancel at least a portion of the interferer signal and output the desired signal combined with a reduced interferer signal.

14. The method of claim 13, wherein the dual parallel electrical RF signal to optical signal converter is a dual parallel Mach-Zehnder modulator (DPMZ).

15. The method of claim 13, further comprising providing a 180 degree phase shift of light traveling through the second arm.

16. The method of claim 13 further comprising providing a radio frequency (RF) interferer configured to generate the interferer signal.

17. The method of claim 16 wherein the RF interferer includes an RF output coupled to an interferer antenna via a coupler, the coupler being configured to generate the interferer reference signal.

18. The method of claim 13 further comprising providing a radio configured to receive the converter output and process the desired signal.

19. The method of claim 18 wherein the radio includes a transmit/receive switch configured to control signal reception from the converter output.

20. The method of claim 18 wherein the radio has an antenna input coupled to the converter output.

21. The method of claim 13 further comprising providing an ICS antenna coupled to the first electrode of the converter.

22. The method of claim 1 further comprising providing a photo detector coupled to the converter output, the photo detector having an output configured for connection to a radio antenna input.

23. The method of claim 1, further comprising providing an optical adaptive matched filter in the second arm.

24. The method of claim 23, where the optical adaptive matched filter is a closed-loop system having optical filter weights, such that the converter output controls fine-tune adjustments of the optical filter weights.

* * * * *